United States Patent [19]

Peterson

[11] Patent Number: 4,955,622
[45] Date of Patent: Sep. 11, 1990

[54] STOP APPARATUS FOR USE IN COLLETS

[75] Inventor: Donald M. Peterson, Bellevue, Wash.

[73] Assignees: James A. Haggerty; Thomas E. Hawkes

[21] Appl. No.: 255,860

[22] Filed: Oct. 11, 1988

Related U.S. Application Data

[63] Continuation-in-part of Ser. No. 180,183, Apr. 11, 1988.

[51] Int. Cl.$^5$ .............................................. B23B 31/20
[52] U.S. Cl. .................... 279/15; 279/46 R; 279/1 Q
[58] Field of Search ................ 279/15, 2 R, 1 Q, 46, 279/47, 48; 242/72.1

[56] References Cited

U.S. PATENT DOCUMENTS

| | | | |
|---|---|---|---|
| 1,582,445 | 4/1926 | Border | 279/1 ME |
| 2,717,128 | 9/1955 | Heizer | 242/72.1 |
| 2,922,656 | 1/1960 | Belloli | 279/15 |
| 3,360,276 | 12/1967 | Peffer | 279/2 R |
| 3,615,101 | 10/1971 | Oliver | 279/15 |

FOREIGN PATENT DOCUMENTS

| | | | |
|---|---|---|---|
| 2123406 | 4/1972 | Fed. Rep. of Germany | 279/15 |
| 180042 | 3/1954 | German Democratic Rep. | |
| 1202735 | 1/1986 | U.S.S.R. | 279/2 R |
| 1206016 | 1/1986 | U.S.S.R. | 279/2 R |

Primary Examiner—Z. R. Bilinsky
Assistant Examiner—R. Schultz
Attorney, Agent, or Firm—Klarquist, Sparkman, Campbell, Leigh & Whinston

[57] ABSTRACT

The stop apparatus fits into the bore of a collet and incorporates a sleeve which is expanded in diameter to lock the apparatus in place. The stop face is the end of a cylindrical rod which slides in a bore in the body of the apparatus and is held at a desired position by a set screw. The body is a body of revolution with a bore for accepting the rod and an outer surface comprising a flange at one end, a cylindrical portion, a threaded portion and a knurled portion at the other end. The flange has a conical surface facing the cylindrical portion. The cylindrical portion is surrounded by a split, resilient sleeve held in place by a nut threaded onto the threaded portion. The nut has a conical surface also facing the cylindrical portion. The conical surfaces engage chamfers at the ends of the internal surface of the sleeve so that turning the nut on the body toward and away from the flange causes the sleeve to expand or allows it to contract. The knurled portion is gripped to keep the body from turning when the nut is turned. The set screw is located in the knurled portion. A flange on the sleeve ensures that the adjusting nut remains accessible.

1 Claim, 1 Drawing Sheet

STOP APPARATUS FOR USE IN COLLETS

BACKGROUND OF THE INVENTION

This application is a Continuation-In-Part of Application Serial No. 180,183, filed Apr. 11, 1988 by the same inventor, to be abandoned after this application is filed.

FIELD:

The subject invention is in the field of machine tools and, more specifically, the field of auxilliary apparatus used on machine tools such as lathes and drill presses. More specifically still it is in the field of auxilliary apparatus known in the art as collets and, even more specifically, the field of stop apparatus used in collets to control the depth of insertion of work pieces into the collets.

PRIOR ART:

Prior art stop apparatuses for use in collets and spindles are shown in the following U.S. Pat. Nos.:

| | |
|---|---|
| 1,014,051 | 3,385,607 |
| 2,398,278 | 3,615,101 |
| 2,423,551 | 3,876,214 |
| 3,115,798 | 4,702,484 |

Also, a stop for collets, manufactured by the Hardinge Company and which is in wide use, is shown in FIG. 1 of the attached drawings.

Prior art pertinent to the preferred embodiment of the subject stop apparatus is shown in the following U.S. Pat. Nos.:

| | | | |
|---|---|---|---|
| 3,188,101 | 3,311,383 | 3,360,276 | 3,615,101 |

It will be clear to those skilled in the art, from an examination of the patents for stop apparatuses, that these patented apparatuses were configured to fit into collets and such of specific configurations and dimensions for each stop apparatus. One possible exception to this observation is the apparatus of U.S. Pat. No. 2,398,278, which fits in the bore of a lathe spindle and is expanded to hold it in place. This expansion feature would enable the apparatus to be effective in a small range of spindle bore diameters; however, the design details and the content of the patent indicate that this capability is incidental. Having each apparatus adaptable to a particular size and configuration of collet (or spindle) presents an economic burden in that a wide variety of stop apparatuses would be needed by a machinist to meet a range of requirements. In the Hardinge concept, the part termed the stop holder for purposes of this disclosure is dimensioned to fit a specific size of collet in the available range of sizes of collets.

The closest known prior art to the subject invention is disclosed in U.S. Pat. No. 3,615,101, C.E. Oliver. Oliver's collet stop is retained in place in the collet by expandable apparatus expanded by tightening a nut having a conical face into a conically shaped end of the expandable apparatus. The nut for expanding the expandable apparatus is located inside the collet and thus is difficult to reach.

It will also be evident from examination of the prior art that the various apparatuses are relatively complex, requiring more than four parts, the Hardinge apparatus being an exception and requiring only three. Also, the various apparatuses are relatively difficult to use, particularly the apparatus of Oliver with the inaccessibility of the adjustment nut used to install the stop in a collet.

In his work as a machinist the inventor of the subject apparatus found a need for stop apparatus for collets, termed collet stops, which would retain the simplicity of the Hardinge stops but have the capability for one apparatus to fit a range of sizes of collets, thus reducing the number of collet stops needed for a machinist to have a full complement of collet stops. The inventor also noted the need, particularly in making short runs of particular parts, to be able to install and adjust the stops more quickly and easily than possible with the prior art apparatuses, including the Hardinge equipment.

The objectives of the subject invention are to meet these needs.

SUMMARY OF THE INVENTION

The subject apparatus is fitted into the bore of a collet through the open end, and tightened into place. The point at which work stock inserted into the collet will be stopped is then set by loosening a set screw in the apparatus, sliding a rod in the central bore of the apparatus to the desired position and tightening the set screw to hold the rod in the set position.

The apparatus comprises a body, a sleeve, an adjustment nut, a rod and a set screw. The body is a body of revolution, having a cylindrical bore and a specially shaped outer surface. The outer surface is basically cylindrical. At one end there is a flange having a cylindrical surface portion and a conical surface portion with the conical surface extending from the cylindrical surface of the flange to the cylindrical surface of the body. At the other end of the body the body is knurled for a portion of its length and screw-threaded from the knurled portion for a distance to the cylindrical surface of the body. In other words, the surface of revolution of the body comprises, in sequence, a flange at one end, a cylindrical surface, a threaded portion and a knurled portion at the other end. The outside diameter of the knurled portion is smaller than the root diameter of the threads of the threaded portion. The nut threads onto the threaded portion and is a hex nut with one side flat and the other conical and it is installed with its conical side facing the conical portion of the flange. The sleeve fits over the cylindrical surface of the body and engages the two conical surfaces. Its inner surface is cylindrical with chamfers at each end, the chamfer angles matching the angles of the conical surfaces. Its outer surface is cylindrical with cylindrical ribs spaced apart along its length. Further, the sleeve may have a radial flange at one end. The sleeve is made of elastomeric material such as acetal plastic with Delrin a preferred material and it is slotted lengthwise. When the nut is turned on the body to move it toward the flanged end the conical surfaces interact to enlarge the outside diameter of the sleeve to expand against the bore of the collet, to hold the apparatus in place in the collet. When the sleeve is fully functional inside the bore, the nut is fully accessible outside the bore. A threaded hole for the set screw is located in the knurled portion. A set screw in the threaded hole can be tightened against the rod inserted into the bore of the body, the end of the rod in the bore serving as the stop surface.

The assembly is used by inserting it into a collet through the open end of the collet with the nut and knurled portion exposed, holding the body by the knurled portion, turning the nut to expand the sleeve to clamp the assembly in place, loosening the set screw, adjusting the rod to position the stop surface as desired and tightening the set screw. The apparatus is inserted into the collet with the adjusting nut left exposed for easy accessibility. The flange on the sleeve, if used, ensures that the adjusting nut will be left exposed.

Each stop assembly can be used with a range of collet sizes having bore diameters in the expansion range of the sleeve, eliminating the need to have a stop assembly for each collet size.

The invention is explained in more detail below with reference to the attached drawings.

DETAILED DESCRIPTION OF THE INVENTION

Figure 1:
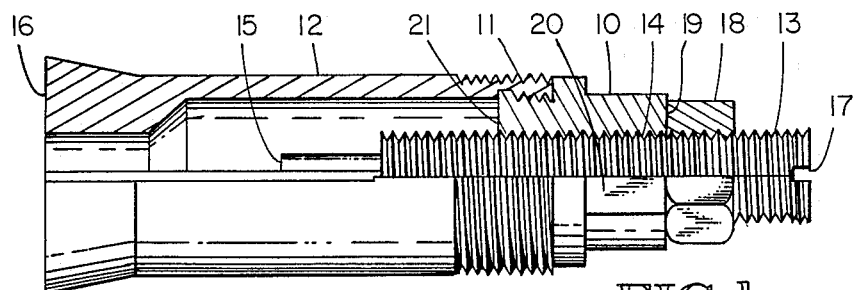
FIG. 1 is a partial, sectional view of a collet with a prior art stop apparatus installed.

Referring to FIG. 1, a partially sectioned view of a collet with a prior art stop apparatus installed, body (stop holder) 10 of the apparatus is threaded at 11 into collet 12, the threads being provided in commercially available collets for the specific purpose of the installation of stop apparatus. Stop rod 13 is threaded into threaded hole 14 in the body. End 15 is the stop face and its distance from end 16 of the collet is adjusted by turning rod 13 using screwdriver slot 17. The adjustment is locked by turning lock nut 18 against end 19 of the body while keeping the rod from turning. Flat(s) 20 on the body are used to control the turning of the body and/or the collet into which it is installed. This adjustment procedure requires a wrench and a screwdriver, the wrench to operate the lock nut and the screwdriver to adjust the nut. Maximum extension of the rod toward end 16 may be facilitated by putting the lock nut adjacent to end 21 of the body although this complicates the adjustment procedure.

Figure 2:
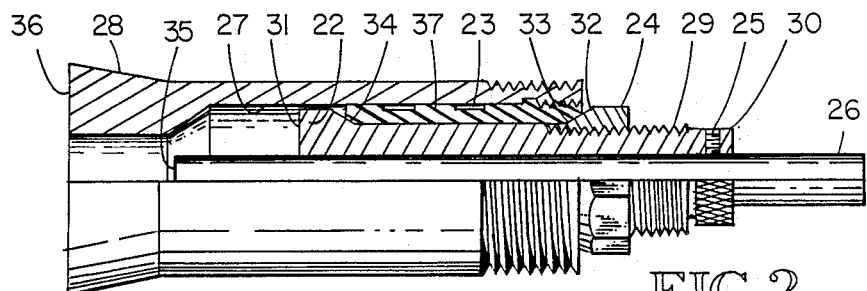
FIG. 2 is a partial sectional view of a collet with the subject apparatus installed.

FIG. 2 is a partially sectioned view of a collet with the subject apparatus installed. The apparatus comprises body 22, sleeve 23, nut 24, set screw 25 and stop rod 26. This apparatus is installed by inserting it into bore 27 of collet 28 and turning nut 24 on threaded portion 29 while controlling the turning of the body by grasping knurled portion 30 of the body. As the nut is turned to move closer to end 31 of the body, sleeve 23 is caused to expand in diameter by the camming actions of conical surface 32 on the nut against conical chamfers 33 and 34 on the ends of the sleeve. The sleeve is slotted from end to end and made of resilient material to allow expansion and contraction of its outside diameter. Care is taken to leave nut 24 accessible for adjustment of the stop apparatus.

Expansion of the sleeve holds the apparatus in place in the bore of the collet. Adjustment of the distance of end 35 of rod 26 from end 36 of the collet can be done with a screwdriver. The smooth exterior of the rod accepts graduated markings, if desired, to assist in adjustment of the location of the stop face, end 35 of the rod. The ribs on the outer surface of the sleeve, rib 37 being typical, help the sleeve to accommodate to any irregularities in the bore of the collet and provide for a firmer grip of the apparatus in the collet. A preferred material for the sleeve is acetal plastic, Delrin in particular.

Figure 3:
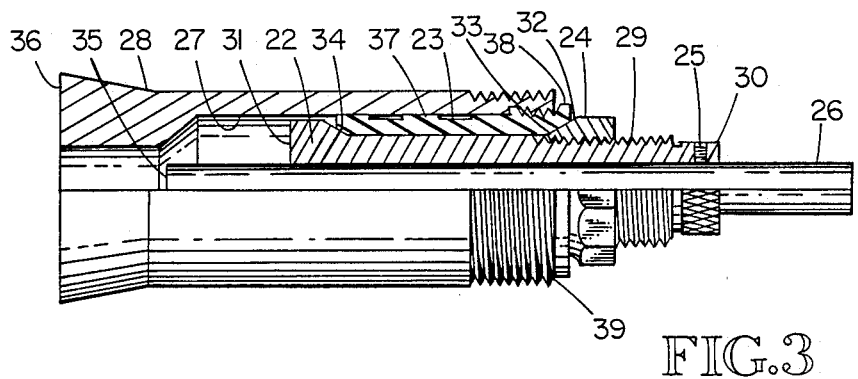
FIG. 3 is a partial sectional view of a collet with an alternate embodiment of subject apparatus installed, the sleeve of the apparatus having a radial flange.

FIG. 3 is a partially sectioned view of a collet with an alternate embodiment of the subject invention installed. In this embodiment sleeve 23 has a flange 38 which engages end 39 of collet 28 and limits the depth of insertion of the collet stop apparatus into the collet, ensuring that nut 24 remains readily accessible for installation and removal of the stop apparatus.

It will be understood that the invention meets its objectives. It is simple, comprising three parts and a set screw and one unit will fit a plurality of collets. Adjustment is simple and quick, requiring only a screwdriver or Allen wrench, depending on the type of set screw used. All adjustment apparatus is readily accessible.

It will also be understood by those skilled in the art that while a preferred embodiment of the invention is described herein, other embodiments and variations of the one disclosed are possible within the scope of the invention which is limited only by the attached claims.

I claim:

1. The combination of stop apparatus for use in a collet and said collet, said collet having a collet bore, said apparatus being insertable a distance into said collet bore and comprising:

a body having a body bore, an outer surface of revolution having an axis, a first end and a second end, said outer surface comprising in sequence a flange at said first end, a cylindrical portion, a threaded portion and a knurled portion, said flange having a first conical surface facing said cylindrical portion, a resilient sleeve surrounding said cylindrical portion and having an outside diameter, said sleeve being slotted longitudinally whereby said diameter may be varied, said sleeve having a sleeve bore, a first sleeve end and a second sleeve end, conical chamfers in said sleeve bore at said first and second sleeve ends and a radial flange at one of said sleeve ends, a rod slidable in said body bore and having a stop face means for preventing said rod from sliding in said body bore, said apparatus further comprising a nut threadable on said threaded portion and having a second conical surface and being threaded onto said threaded portion with said second conical surface facing said cylindrical surface whereby when said nut is turned on said body such that said second conical surface approaches said first conical surface, said conical surfaces and said chamfers cooperate to cause said diameter to increase and vice versa, said knurled portion providing means for preventing said body from turning with said nut, whereby with said sleeve installed on said body with said radial flange at said one of said sleeve ends next to said nut and said apparatus inserted into said collet bore, said distance is limited by contact between said radial flange and said collet, and further, whereby when said nut is turned such that said second conical surface approaches said first conical surface, said diameter increases such that said sleeve engages said collet bore and holds said apparatus in place in said collet, and further whereby when said rod is slidably adjusted in said body bore and then prevented from sliding by said means for preventing it from sliding, said stop face is positioned with respect to said collet, the improvements comprising, in combination: (1) location of said nut outside of said collet bore by the limitation of said distance by contact between said radial flange and said collet, said location of said nut rendering it readily accessible for adjustment for installation and removal of said apparatus and (2) location of said nut and said knurled portion outside of said collet, whereby both said body and said nut are accessible for adjustment of said apparatus.

* * * * *